July 27, 1926.
T. V. OGDEN
BIT RING
Filed Sept. 8, 1925
1,594,018
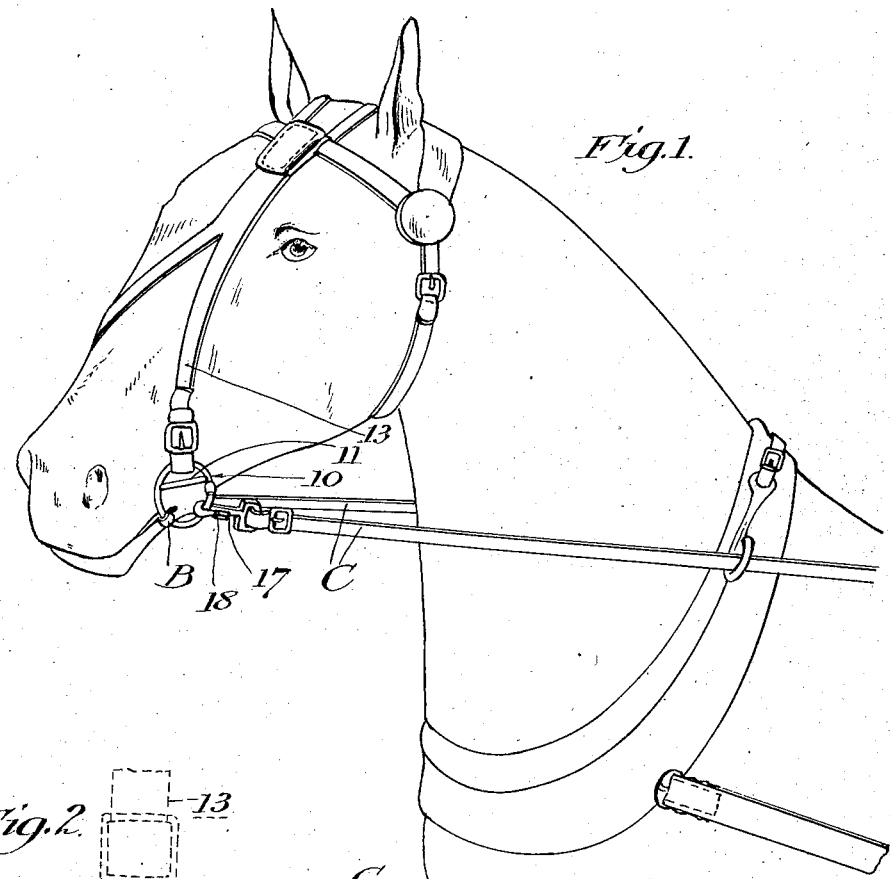
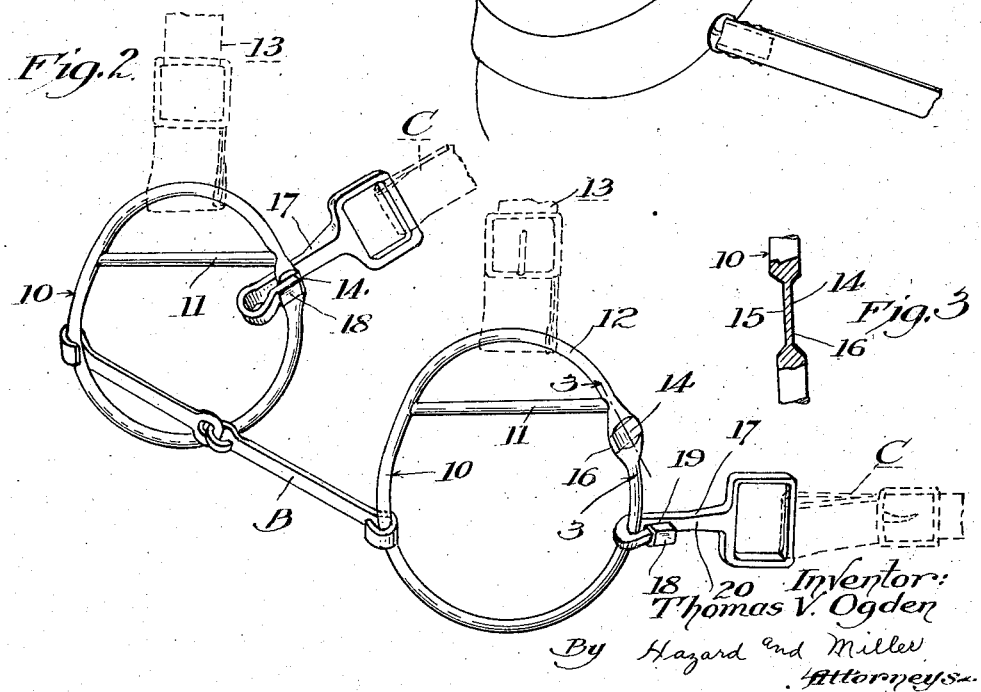

Patented July 27, 1926.

1,594,018

UNITED STATES PATENT OFFICE.

THOMAS V. OGDEN, OF SANTA ANA, CALIFORNIA.

BIT RING.

Application filed September 8, 1925. Serial No. 54,976.

This invention relates to improvements in bit rings for horses' bits and the like.

An object of the invention is to provide a ring to which the end of a horse's bit may be attached, which ring is so constructed that an attaching member, which may be attached to a check rein, may be easily and quickly attached and detached therefrom.

A further object of the invention is to provide a bit ring having a hook attachable to and detachable therefrom, which hook is adapted to have the check rein connected to it, and which eliminates the use of springs for attaching and detaching the hook to the ring.

With the foregoing and other objects in view which will be made manifest in the following detailed description and specifically pointed out in the appended claim, reference is had to the accompanying drawings for an illustrative embodiment of the invention, wherein:—

Figure 1 is a perspective view illustrating the improved ring in applied position.

Fig. 2 is a perspective view illustrating two of the rings with the bit connected to them, one of the hook members being shown as being detached from the ring, and Fig. 3 is a sectional view taken upon the line 3—3 of Fig. 2.

Referring to the accompanying drawings wherein similar reference characters designate similar parts throughout, the ring is indicated at 10, being circular or of any other desired form, and two of the rings are connected to the opposite ends of the bit B. Adjacent the top of the each ring a strut 11 extends thereacross, defining a portion 12 on the ring, to which a strap 13 may be connected, which passes over the horse's head. The strut 11 maintains the strap 13 on the portion 12 and in this manner the ring will not be permitted to readily rotate relatively to the strap 13 and the bit B.

On the rearward side of each ring and adjacent the end of the strut 11 there are formed two grooves 14 and 15 which are on opposite sides of the ring and are opposite each other to provide a portion 16 of reduced thickness. These grooves are extended across the ring other than at a right angle, or in other words the grooves are not on radii from the center of the ring.

A hook 17 is also provided, to which the check rein C may be connected. The end of the hook, indicated at 18, is provided with a flattened surface 19 disposed in spaced relation from the shank 20. The space between the flattened surface 19 and the shank 20 is approximately equal to the thickness of the reduced portion 16. In this manner it will be obvious that the hook cannot be applied to or detached from the ring at any other part than at the reduced portion 16, which is always located above the center of the ring because of the limited movement of the ring relatively to the strap 13 limited by means of the strut 11. Consequently, there is no danger of the hook 17 rising on the ring so that it might slip off from it on the reduced portion 16. Furthermore, as the grooves are other than radial, it will be noted that in order to detach the hook from the ring, it will be necessary to turn the hook upwardly. This is an unnatural position for the hook because of the fact that there is usually tension on the check rein C, but if there is no such tension, the hook will normally slide to the bottom of the ring. However, if it is desired to manually attach the check rein to the ring or to detach it from it, the hook can be readily turned into the required position and caused to slide on or off from the ring on the reduced portion 16.

From the above it will be appreciated that an improved bit ring and fastener or attaching member is provided, which eliminates the use of springs, but facilitates the attachment or detachment of the check rein C.

It will be understood that various changes in the detail of construction may be made without departing from the spirit or scope of the invention as defined by the appended claim.

I claim:—

A bit ring comprising a ring to which one end of a horse's bit is adapted to be attached, said ring having a strut extending across a portion thereof and forming a strap receiving opening adapted to be disposed at the upper portion of the ring when the ring is attached to the bit and having a portion of reduced thickness adjacent said strut, and a hook to which a check rein is adapted to be connected, said hook having its end spaced from the shank a distance approximately equal to the thickness of the reduced portion of the ring, whereby the hook may be slipped into and off from the ring only at the portion of the reduced thickness which is so disposed in the normal position of the device as to prevent accidental displacement thereof.

In testimony whereof I have signed my name to this specification.

THOMAS V. OGDEN.